(No Model.)

J. M. DYER.
WAVE POWER.

No. 581,021. Patented Apr. 20, 1897.

Witnesses,

Inventor,
James M. Dyer
By Dewey & Co.
Attys

UNITED STATES PATENT OFFICE.

JAMES M. DYER, OF SAN FRANCISCO, CALIFORNIA.

WAVE-POWER.

SPECIFICATION forming part of Letters Patent No. 581,021, dated April 20, 1897.

Application filed August 3, 1896. Serial No. 601,453. (No model.)

*To all whom it may concern:*

Be it known that I, JAMES M. DYER, a citizen of the United States, residing in the city and county of San Francisco, State of California, have invented an Improvement in Wave-Power; and I hereby declare the following to be a full, clear, and exact description of the same.

My invention relates to a means for applying the motion and force of the waves and in transmitting this motion and converting it into a rotary motion which may be applied to machinery for various purposes.

It consists in certain details of construction which will be more fully explained by reference to the accompanying drawings, in which—

Figure 1:
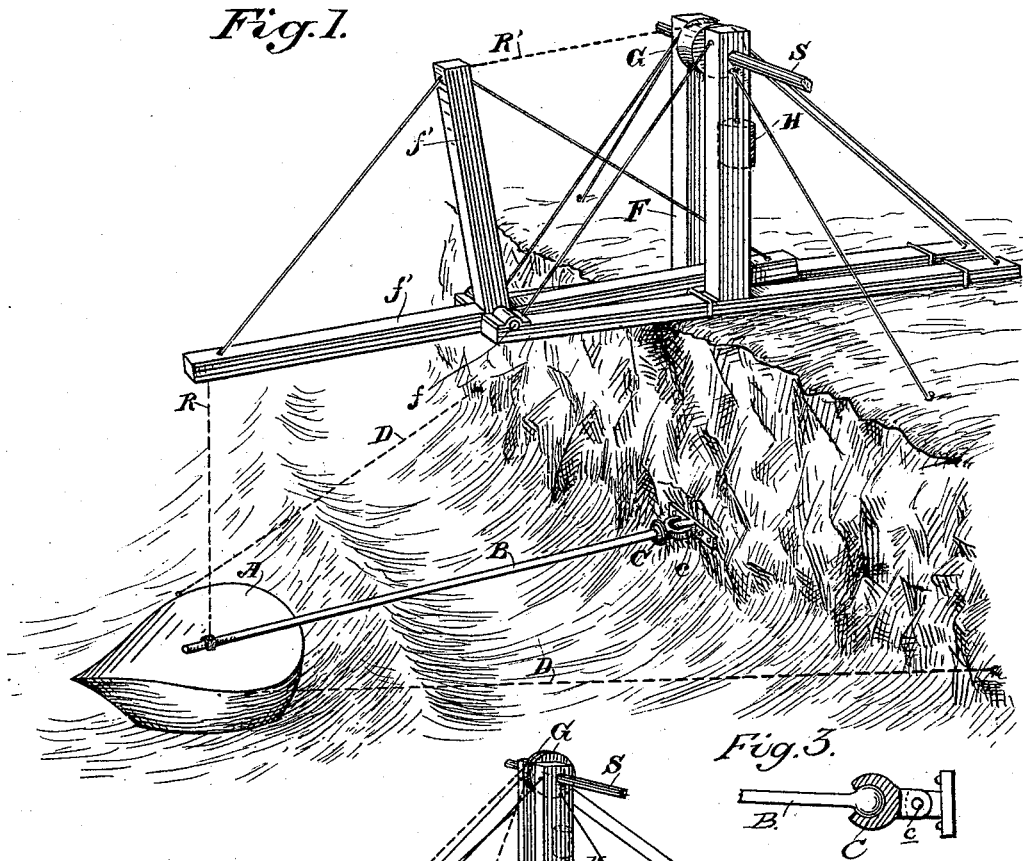
Figure 3:
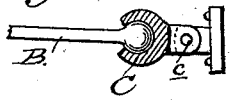
Figure 2:
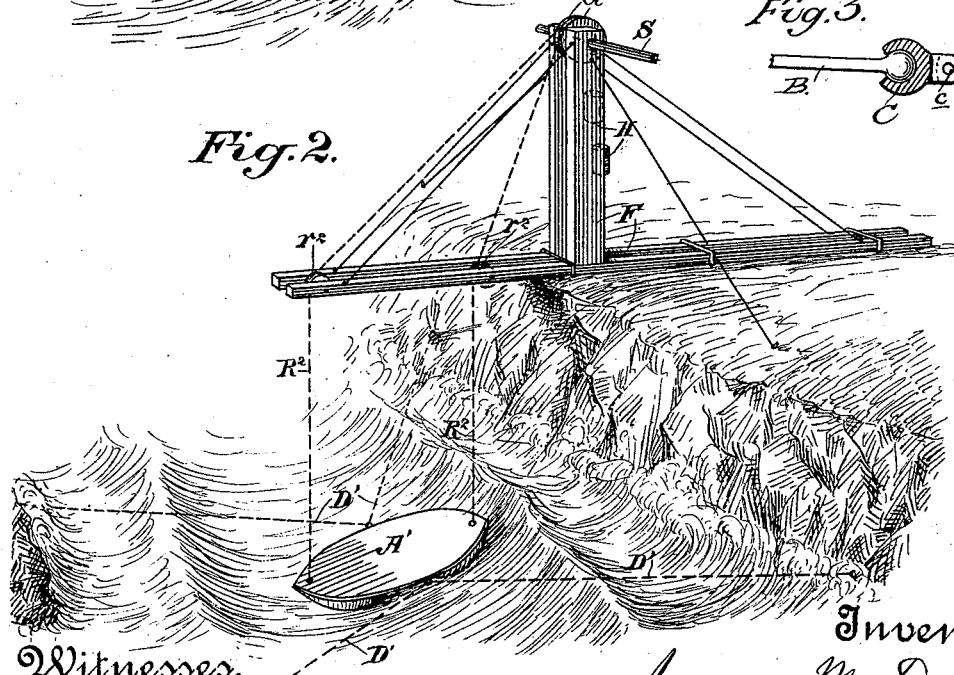

Figure 1 is a view showing one form of my apparatus. Fig. 2 is a modification of the same. Fig. 3 is a detail of the universal joint C.

My present invention is an improvement upon an apparatus for which a patent was issued to me September 29, 1891, No. 460,371; and it has for its object an improvement in the manner of anchoring and operating the float and in the means for transmitting its movements.

Referring to Fig. 1, the float A, which may be of any desired size, shape, and material, is slidably connected with the outer end of a beam B, the inner end of which is provided with a ball or universal joint C, which is fixed at some suitable point with relation to the float so that as the latter is moved up and down by the action of the waves the joint will yield to allow of this movement.

In order to prevent undue side motion, I have shown guy ropes or chains D, which are fixed to opposite sides of the float and diverge therefrom to points in line with the ball-joint, where they are fixed, thus preventing side oscillations, while allowing the utmost freedom of vertical motion about an axis which is common to the fixed ends of the guy-ropes and the inner end of the rigid beam to which the float is slidably attached. The ball-joint is itself hinged and movable up and down, as shown at *c*, to accommodate itself to rise and fall in the tide. Above the beam and the float is a timber or framework F. To one end of this is pivoted at *f* an elbow-lever *f'*, the horizontal arm of which projects outwardly approximately in line above the float.

A rope R or other flexible connecting device leads from the float vertically to the extremity of this horizontal arm and is there attached. A second rope or line R' leads from the vertical arm of this elbow-lever back to and over a drum G and terminates in a weight H.

The drum G is to be provided with a pawl-and-ratchet or a clutch mechanism of any suitable or well-known description, unnecessary herein to show, as it forms no part of my invention, so that movement of the float in one direction will be transmitted to rotate the drum and its connected shaft S, and movement in the other direction will, by reason of the ratchet or clutch mechanism, return the drum without interrupting the movement of the shaft, which may be continued by its momentum or by connection with two or more floats.

In Fig. 2 I have shown what may be termed a "double" float A', and have so anchored it by means of guy ropes or chains D' that the action of the waves will alternately raise first one end and then the other in addition to a general rise and fall of the whole float.

Each end of the float is connected by a flexible rope $R^2$, passing over pulleys $r^2$ in the frame F, approximately vertical above the ends of the float, with the drum G, through which the power is transmitted, as before described. Said ropes are provided with weights H. The operation in this case will be such that the alternate rise and fall of the opposite ends of the float transmit motion to the drum and its connected mechanism, and these alternate oscillations, taken with general rise and fall, produce a more nearly continuous rotary motion of the power-shaft.

The object of this invention is to obtain a more direct action of the float through its flexible connections to the driving-drum.

Having thus described my invention, what I claim as new, and desire to secure by Letters Patent, is—

1. In a wave-power motor, the combination of a float, a rigid arm or beam with the outer end of which the float is slidably connected, said beam having a ball-bearing or universal joint at the inner end, about which it is movable, guy ropes or chains connected with opposite sides of the float, and diverging to points of anchorage which are axially in line with the ball-joint, a suitable framework above, and carrying a driving-shaft, and connections between the float and shaft whereby the latter is driven through the transmitted movements of the former.

2. In a wave-power motor, the combination of a float, a rigid arm or beam with the outer end of which the float is slidably connected, said beam having a ball-bearing or universal joint at the inner end about which it is movable, and a supplemental hinge whereby said joint may adjust itself for the rise and fall in the tide, guy ropes or chains connected with opposite sides of the float and diverging to points of anchorage which are axially in line with the ball-joint, a suitable framework above and carrying a driving-shaft, and connections between the float and shaft whereby the latter is driven through the transmitted movements of the former.

3. In a wave-power motor, the combination of a float, a rigid arm or beam with the outer end of which the float is slidably connected, said beam having ball-bearing or universal joint at the inner end about which it is movable, guy ropes or chains connected with opposite sides of the float, diverging to points of anchorage which are axially in line with the ball-joint, a framework above, carrying a driving-shaft, a pivoted lever carried by said framework, a connection between the float and the lever, and a connection between the lever and the driving-shaft whereby the latter is operated by the transmitted movements of the float.

4. In a wave-power motor, the combination of a float, a rigid arm or beam at the outer end of which the float is slidably connected, said beam having a ball-bearing or universal joint at the inner end about which it is movable, and a supplemental hinge, whereby said joint may adjust itself for rise and fall in the tide, guy ropes or chains connected with opposite sides of the float, diverging to points of anchorage which are axially in line with the ball-joint, a framework above, carrying a driving-shaft, a pivoted lever carried by said framework, a connection between the float and the lever, and a connection between the lever and the driving-shaft, whereby the latter is operated by the transmitted movements of the float.

In witness whereof I have hereunto set my hand.

JAMES M. DYER.

Witnesses:
S. H. NOURSE,
JESSIE C. BRODIE.